United States Patent [19]
Page

[11] 3,848,627
[45] Nov. 19, 1974

[54] APPARATUS FOR MAINTAINING THE WATER LEVEL WITHIN A SWIMMING POOL TO PREDETERMINED LIMITS

[76] Inventor: Littleton D. Page, Rt. 2, Box 798, Tucson, Ariz. 85715

[22] Filed: July 20, 1973

[21] Appl. No.: 381,360

Related U.S. Application Data

[63] Continuation-in-part of Ser. No. 220,976, Jan. 26, 1972, Pat. No. 3,759,286.

[52] U.S. Cl. ............................ 137/392, 4/172.17
[51] Int. Cl. ............................................ G05d 9/12
[58] Field of Search .......... 137/213, 214, 386, 392, 137/412, 428, 429, 433; 210/103, 104, 169; 73/290 R, 304 R, 319; 4/172, 172.17; 141/95; 417/211.5

[56] References Cited
UNITED STATES PATENTS

| | | | |
|---|---|---|---|
| 2,790,459 | 4/1957 | Thomas | 137/412 |
| 3,428,072 | 2/1969 | Welch | 137/392 X |
| 3,537,111 | 11/1970 | Whitten, Jr. | 4/172.17 |
| 3,596,673 | 8/1971 | Laucournet | 137/392 X |
| 3,759,286 | 9/1973 | Littleton | 137/392 |

*Primary Examiner*—William R. Cline
*Assistant Examiner*—David R. Matthews
*Attorney, Agent, or Firm*—Cahill, Sutton & Thomas

[57] ABSTRACT

In order to maintain the water level of a swimming pool within predetermined limits, an electrically operated valve connected between a source of makeup water and the pool is opened whenever the water falls below a first predetermined level and is closed whenever the water reaches a second, higher predetermined level. Water level detection is carried out in a vertically disposed sensing tube in liquid communication with a point in the return line of the filtering circuit. A plurality of vertically separated conductive probes extend into the sensing tube to provide water level information according to conduction paths set up between a lowermost, common probe and those of the other probes which are below the water level. When the recirculating pump is not in operation, the water level reflects the water level in the pool. When the pump is energized, the pressure in the return line rises such that the sensing tube fills completely and thus automatically prevents operation of the valve inasmuch as an artificial high level condition is detected by the circuit coupled to the level sensing probes. To prevent a backflow into the makeup water source, a valved air gap is disposed intermediate the fill line and the pool water. The valved air gap may be incorporated into a remote water level sensing chamber, which sensing chamber includes valve means for regulating the flow of fill water.

2 Claims, 11 Drawing Figures

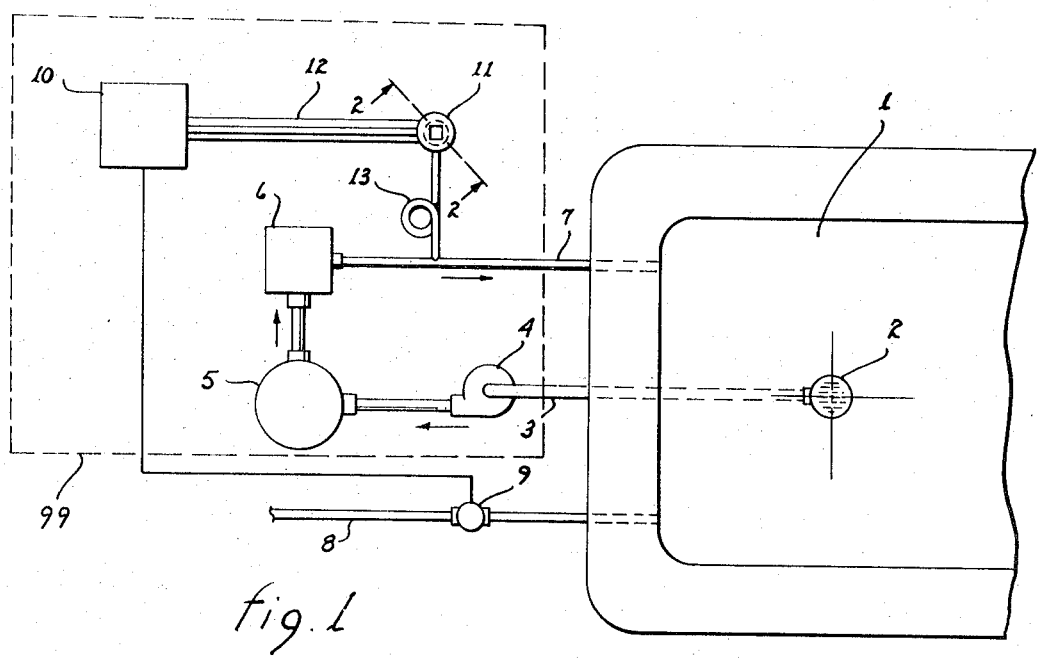
fig. 1
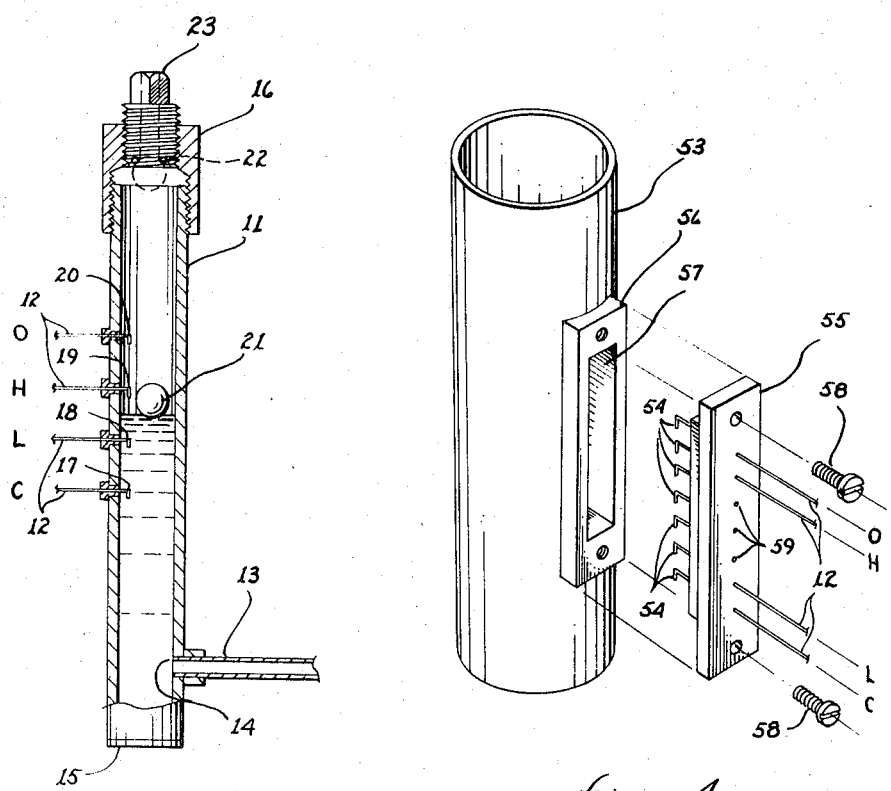
fig. 2
fig. 4

APPARATUS FOR MAINTAINING THE WATER LEVEL WITHIN A SWIMMING POOL TO PREDETERMINED LIMITS

This patent application is a continuation-in-part application of an application entitled "Apparatus for Maintaining the Water Level Within a Swimming Pool to Predetermined Limits," Ser. No. 220,976, filed Jan. 26, 1972, now U.S. Pat. No. 3,759,286.

This invention relates to the liquid level control arts, more particularly to apparatus for maintaining the water level in a swimming pool within predetermined maximum and minimum levels.

The water level within a swimming pool should be kept within a rather narrow range in order that the skimming portion of the recirculating and filtering apparatus will function properly. This level is usually maintained by simply observing the water level and supplying makeup water from a line source with a manually operated valve. However, because the volume of water necessary to make up even a slightly low level is considerable, the time necessary to bring the water to the desired level may run several hours, a circumstance which renders the task unpleasant and, additionally, brings about the possibility of overfilling due to failure to monitor the progress of the operation carefully enough. Thus, it will be apparent that it would be highly desirable to provide automatic means for maintaining the water level of the swimming pool within predetermined maximum and minimum limits without the need for manual supervision or intervention.

Most presently known pool filling apparatus operating in an automatic mode responsive to the water level within the pool are not compatible with many plumbing and building codes and other water use restrictions. These codes and restrictions invariably require some reverse flow preventive apparatus to preclude the possibility of contaminating the municipal water supply system. Valves precluding reverse flow are known but they are generally expensive and not suitable for use in conjunction with existing plumbing systems for pools. It is therefore further apparent that it would be of benefit to provide apparatus for inhibiting reverse flow within the water fill pipe useable in conjunction with existing pool water filtration and circulation systems.

It is therefore a broad object of my invention to provide means for automatically maintaining the water level within a swimming pool.

It is another object of my invention to provide water level maintaining apparatus which may be readily incorporated into existing, as well as new, swimming pools.

It is still another object of my invention to provide safe, reliable and economical pool water filling systems.

It is yet another object of my invention to provide a differential water level control system to maintain the pool water level and mitigate scum and/or mineral buildup of the type encountered with single level control apparatus.

It is a further object of the present invention to provide a water fill apparatus for pools, which apparatus inhibits reverse flow into the municipal water supply system.

It is a yet further object of the present invention to provide a remote mechanical water level sensor to control the water flow through the water makeup line.

It is a still further object of the present invention to provide a control circuit for maintaining the water level within a pool, which circuit relies upon the inputs from three water level sensing probes whenever the water recirculating pump is not in operation.

These and other objects of the present invention will become apparent to those skilled in the art as the description thereof proceeds.

The present invention may be described with greater specificity and clarity with reference to the following figures, in which:

FIG. 1 is a schematic representation of a swimming pool system incorporating the present invention.

FIG. 2 is a cross section of a sensing tube taken along the lines 2—2 of FIG. 1.

FIG. 4 is a partially cut away pictorial illustrating a variant sensing tube configuration.

Figure 3:
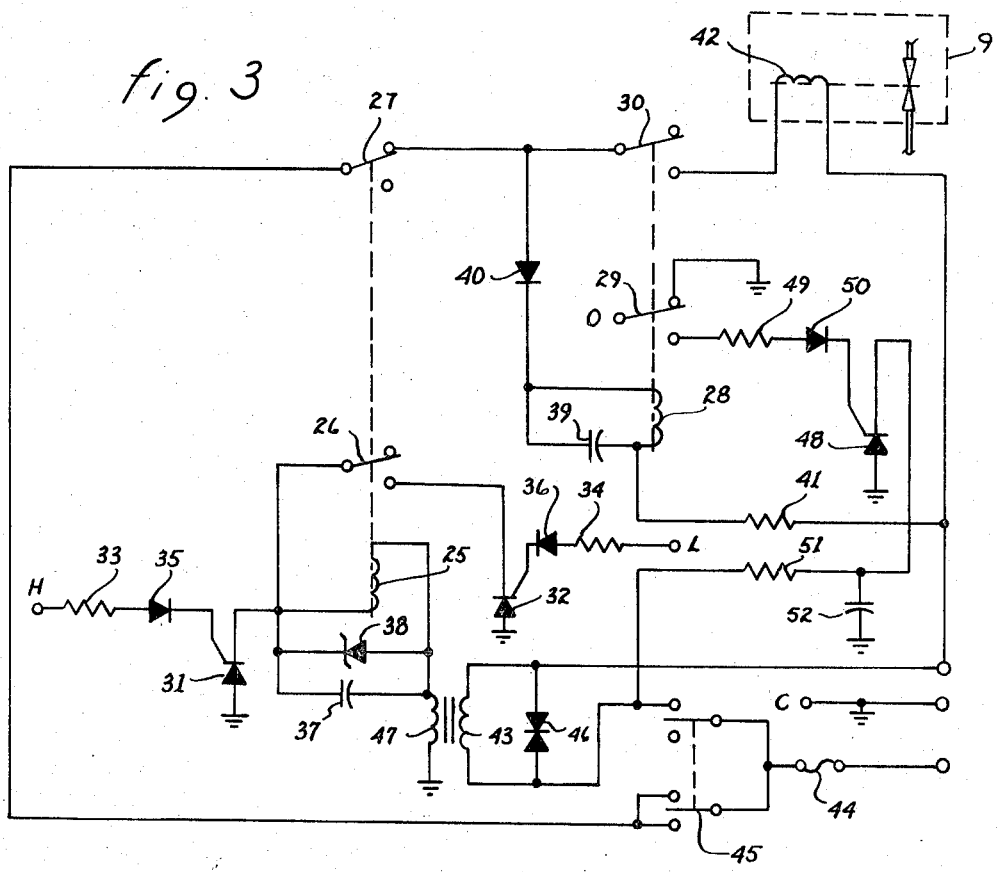
FIG. 3 is a schematic diagram of an exemplary level control circuit comprising part of the present invention.

Attention is now directed to FIG. 1 which illustrates a swimming pool 1 with the usual recirculating system for cleaning and conditioning the water, which system includes a main drain 2 (which may, of course, be supplemented by parallel circuits to other drains and skimmers), a suction line 3 to a pump 4 which forces water through a filter 5 and, if provided, a heater 6. The conditioned water flows back to the swimming pool 1 through a return line 7 which opens into the pool well below the normal water line. In practice, the return line 7 may open into the pool at a plurality of locations and may also feed whip-type cleaners.

Makeup water is supplied to the swimming pool 1 through a makeup line 8 which may be coupled to a conventional water source such as an ordinary city water main. Flow of makeup water from the source into the swimming pool 1 is controlled by a normally closed electrically actuated valve 9. The valve 9 is selectively energized by the output from a level control circuit 10 which, in conjunction with a sensing tube 11 monitors the water level in the pool and permits makeup water flow in accordance therewith to maintain the water level within predetermined limits. As will be explained more fully below, the level control circuit 10 is connected to a plurality of conductors 12 which are connected to a corresponding plurality of sensing probes (not shown in FIG. 1) in the sensing tube 11. The interior of the sensing tube 11 is placed into direct liquid communication with the return line 7 by means of a tube 13. The sensing tube 11 is vertically positioned such that a normal range of water level within the swimming pool 1 falls intermediate along its length, and the point 14 at which the tube 13 is connected to the return line 7 may conveniently be below the lowest expected water level in the pool although this is not absolutely necessary in a tight system. Therefore, when the pump 4 is not operating, the water level in the swimming pool 1 is accurately reflected into the sensing tube 11.

The structure of the sensing tube 11 may be better understood with reference to FIG. 2 in which it will be observed that the lower end 15 of the sensing tube is sealed off, and the tube 13 is attached near the lower end. The upper end 16 of the sensing tube 11 is provided with a small aperture 23 which performs a venting function to permit the water level reflected into the sensing tube to fluctuate during normal operation. A plurality of vertically separated sensing probes 17, 18, 19 and 20 extend into the sensing tube and are connected to the level control circuit by means of the conductors 12 as previously noted. The lowermost probe 17 is a common probe, and level sensing is achieved by observing whether or not a conductive path is set up between it and a low water level probe 18 or a high water level probe 19 or an overflow water level probe 20. Briefly, should the water level in the sensing tube 11 fall below the low water level probe 18 to break the conductive path between the probes 17 and 18, the level control circuit 10 responds by energizing the electrically actuated valve 9 until the water level reaches the high water level probe 19 whereupon the flow of makeup water is interrupted by de-energizing the electrically actuated valve 9. The overflow level probe 20 senses a condition in which the apparatus fails through malfunction to stop the flow of makeup water and provides redundant sensing to prevent the water level from going any higher.

It will be noted that the water level reflected into the sensing tube 11 from the return line 7 is an accurate indication of the swimming pool water level only when the pump 4 is not operating. When the pump 4 is circulating water through the system, the pressure in the return line 7 is sufficiently high that the water level in the sensing tube 11 immediately becomes much higher than can be accommodated and would result in water being forced continually upwardly from the aperture 23 if some means is not provided to prevent this from taking place. Thus a float 21 riding on top of the water within the sensing tube 11 functions to seal against a gasket means 22 disposed on the underside of the upper end 16 of the sensing tube 11 to seal off the aperture 23 whenever the pump 4 is operating.

Referring now to FIG. 3, an exemplary configuration for the level control circuit 10 is presented. The level control circuit includes a first relay having a coil 25 and first and second s.p.d.t. contact sets 26 and 27 which are shown in the de-energized position. Additionally, a second relay includes a coil 28 and first and second s.p.d.t. contact sets 29 and 30, also shown in the de-energized position. As will be explained more fully below, initial energization of the relay coil 25 is controlled by an SCR 31 with a latching circuit provided through the contact set 26 which brings holding SCR 32 into the coil 25 circuit. Because these SCR's 31 and 32 are a-c fired, resistors 33 and 34 are used in the usual manner to limit the peak gate current and the diodes 35 and 36 are provided to prevent inverse voltage from being applied between the cathode and gate electrodes during the reverse part of a cycle. Capacitor 37 is connected across the relay coil 25 for peaking purposes, and zener diode 38, also disposed across the coil, protects against possible excessive counter EMF developed when the circuit is turned off.

Similarly, relay coil 28 is shunted with a capacitor 39, and the use of a diode 40 and current limiting resistor 41 permit the use of a d-c relay coil 28 which simplifies the overall circuit arrangement. It will be noted that the solenoid coil 42 of the electrically actuated valve 9 is connected in series with, and is therefore controlled by the contact set 30.

Power is supplied from a conventional line source to the primary winding 43 of a stepdown transformer. A fuse 44 in series with one side of the line to the primary winding provides circuit overcurrent protection, and a d.p.d.t. switch 45 permits manual control of circuit energization in the obvious manner. A double diode 46 is connected in parallel across the primary winding 43 to absorb transient surges in excess of the forward breakdown voltages thereof. The secondary winding 47 of the transformer is connected in series with the relay coil 25 and is grounded at one end to complete circuits to the anodes of the SCR's 31 and 32 as well as the other points marked with the ground symbol in the figures.

The overflow protection portion of the circuit includes another SCR 48 which has its gate electrode coupled to the normally opened contact of contact set 29 through resistor 49 and diode 50. The anode of the SCR 48 is grounded, and the cathode is connected through a current limiting resistor 51 to the fused side of the line. Additionally, a capacitor 52 is connected between the cathode of the SCR 48 and ground.

Referring both to FIGS. 2 and 3, the electrical connections between the probes 17, 18, 19 and 20 to the various points in the electrical circuit of FIG. 3 will be noted. Specifically, the common probe 17 is grounded; the lower water level probe 18 is connected into the gate circuit of the SCR 32; the high water level sensing probe 19 is connected into the gate circuit of the SCR 31; and the overflow sensing probe 20 is connected into the gate circuit of the SCR 48. Consider now a condition in which the relay coil 25 is de-energized as shown in FIG. 3. Assuming the switch 45 is closed, the relay coil 28 will be energized through the contact set 27 and the electrically actuated valve 9 will have its solenoid coil 42 energized through the contact sets 27 and 30. Thus, this condition results in makeup water being admitted to the pool, and the water level will continue to rise until it reaches the high water level probe 19 in the sensing tube 11 at which time a conductive path is set up between the probe 19 and the common probe 17 to place a ground potential on the gate electrode of the SCR 31 which thereupon fires in the a–c mode to energize relay coil 25. When the contact sets 26 and 27 change position, the circuit to the relay coil 28 and to the solenoid coil 42 are interrupted such that the contact sets 29 and 30 change position and the flow of makeup water ceases.

Subsequently, as the normal water level in the pool drops over a period of time due to evaporation and other normal losses, the level reflected into the sensing tube 11 will first fall below the high water probe 19. However, the relay coil 25 will remain energized because of the latching circuit brought into series with the coil upon closure of the contact set 26. SCR 32 will fire as soon as the contacts 26 close since low water probe 18 is beneath the water level and therefore grounded. As the pool water level continues to drop, the level within the sensing tube 11 will eventually drop below the low water level probe 18 to break the conductive path set up through the water between it and the common probe 17. When this happens, the SCR 32 will be shut off and the resultant de-energization of the coil 25 will permit the contact sets 26 and 27 to assume the position shown in FIG. 3 once again which results in energization of the coil 28 to permit makeup water to flow as previously described. Under normal operating conditions the cycle is repeated automatically to maintain the pool water level within nominal limits between the probes 18 and 19. It will be noted that whenever the pump 4 is energized to bring about an upward surge of the water level within the sensing tube 11, the apparatus automatically detects an artificial high water level condition to interrupt the flow of makeup water.

Consider now a condition in which component failure or the like causes the relay coil 25 to remain de-energized. Should such failure occur, relay coil 28 would remain energized, and the electrically actuated valve 9 would remain open. Thus, the water level in the pool would continue to rise until the level in the sensing tube 11 reaches the overflow sensing probe 20. A ground potential is thereupon placed on the gate circuit of the SCR 48 through the contact set 29. When the SCR 48 fires, sufficient current is drawn through the resistor 51 to blow the fuse 44. The whole system would therefore be shut down to prevent the pool from overflowing by virtue of de-energization of the relay coil 28.

The time constant of the capacitor 39 and the resistor 41 is selected to prevent the contact sets 29 and 30 from closing before the contact sets 26 and 27 for two reasons. First, if the switch 45 is thrown to the on position when the sensing tube 11 is full because the pump 4 is operating, the SCR 48 is prevented from firing on a falsely sensed overflow condition because the relay coil 28 will not have been fully energized by the time the relay coil 25 pulls the contact set 27 which terminates further energization of the relay coil 28. Second, the predetermined difference in energizing times between the relay coils 25 and 28 guards against momentary pulsing of the electrically actuated valve 9 whenever the switch 45 is thrown to the on position when the water level in the sensing tube 11 is at or above the high water level probe 19. Additionally, the time constant of the capicator 52 and the resistor 51 prevents dv/dt firing of the SCR 48 whenever the system is first energized by operating the switch 45. It may be noted that the switch 45, when thrown to its full down position, permits manual actuation of the valve 9 through the contact set 27 and the contact set 30 inasmuch as the coil 28 will be energized thereby.

Certain alternative configurations are contemplated to achieve ease of installation and to decrease the overall system cost. Reference may be taken to FIG. 4 which illustrates a sensing tube 53, corresponding in most details to the sensing tube 11 of FIG. 2, having means for achieving a range of probe level adjustment after installation. A plurality of probes 54 are fixed to one side of a probe mounting block 55 which may be sealingly engaged with a mating piece 56 having a rectangular opening 57 therein such that, when the mounting block 55 is fixed to the mating piece 56 with screws 58 or the like, the probes 54 extend into the interior of the sensing tube 53. Each of the probes 54 presents terminals 59 on the outside surface of the mounting block 55 to which the various conductors 12 may be selectively attached. With this configuration, the vertical position of the sensing tube 53 need not be predetermined to a fine degree of accuracy since the effective level of the various in-circuit probes may be adjusted by connecting the conductors 12 to the terminals 59 which give the desired range of operation.

Figure 5:
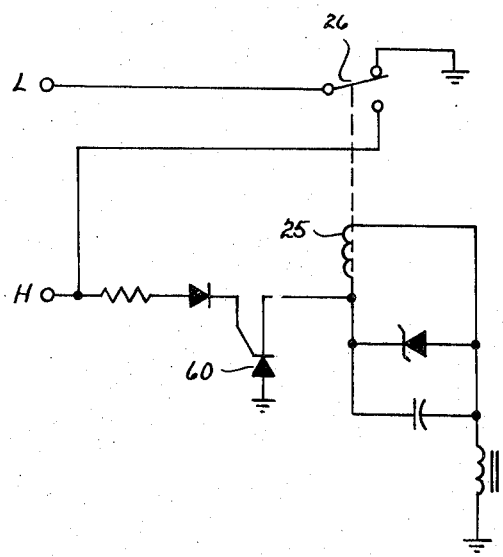
FIG. 5 is a schematic diagram illustrating a simplified control circuit portion.

The circuit described in conjunction with FIG. 3 utilizes two SCR's, 31 and 32, in a latching configuration to provide a safety factor through partial redundancy. The SCR 31 is paralleled by the SCR 32 whenever the water level in the sensing tube 11 is at least as high as the low water level probe 18 except at the instant it first fires. For most of the time during which the relay coil 25 is energized, the SCR 32 alone provides the energy thereto, and therefore the SCR 31 is less likely to fail than the SCR 32. If the SCR 32 should fail, it will be observed that the SCR 31 will function alone to hold the water level near the high water level probe 19 which is a satisfactory level although the loss of the differential level brings about undesirable rapid cycling of the remainder of the circuits including the electrically actuated valve 9. However, it has been demonstrated that the likelihood of failure of a properly chosen SCR is very low, and the circuit simplification illustrated in FIG. 5 utilizing a single SCR 60 to drive the relay coil 25 offers reduced cost at the expense of the above described partial redundancy. Contact set 26, rather than coupling to the redundant SCR circuit, is utilized itself in a latching configuration. Whenever the water level is rising within the sensing tube 11 during a makeup cycle, the relay coil 25 will be de-energized until the water level reaches the high water level probe 19 which fires the SCR 60. Contact set 26 then places the high water level probe 19 and the low water level probe 18 into parallel to keep the SCR 60 in the conducting state until such time as the water level within the sensing tube 11 drops below the low water level probe 18 whereupon the SCR 60 is cut off to initiate another makeup cycle.

Figure 6:
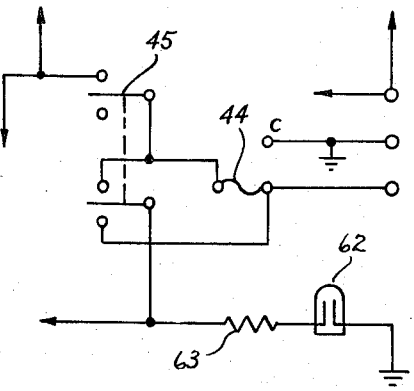
FIG. 6 is a schematic diagram illustrating a modification to the power supply of the level control circuit.

FIG. 6 illustrates a slightly different arrangement for a power switch 45 which permits manual override in the event of a blown fuse. In addition, a neon lamp 62 in series with a current limiting resistor 63 provides a visual pilot lamp indication that the system is in operation.

Figure 7:
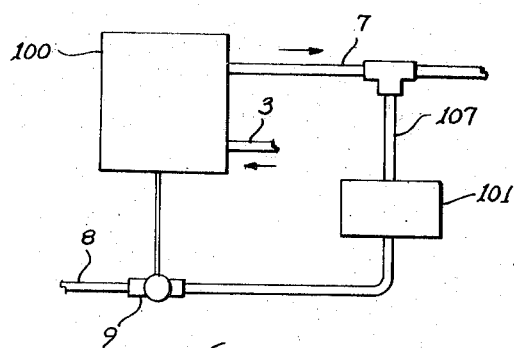
FIG. 7 is a block diagram of the water flow control apparatus of the present invention.

Referring to FIG. 7, there is shown a water control system 100 in block form, which system includes the elements shown within dashed line 99 in FIG. 1. The fresh water flows through makeup line 8, valve 9 and into float chamber 101 shown in block form. A connecting pipe 107 extends from float chamber 101 and intersects return line 7, the latter conveying water to a pool. Suction line 3 conveys water from the pool to water control system 100, as described previously. From FIG. 7, it becomes apparent that the present invention may be incorporated within any existing pool plumbing system having at least a water makeup line.

The float chamber 101 will be discussed in further detail with respect to FIG. 8. The fresh water flowing through makeup line 8 is ejected through a vertical air gap represented by numeral 102. The air gap is formed by a cover 103 circumscribing the end of makeup line 8. An apertured base 104 is vertically disposed from cover 103 by an amount equivalent to air gap 102. The cover 103 and base 104 are interconnected by a screen 105. Screen 105 inhibits the introduction of foreign matter into the water flowing out of makeup line 8, but permits the flow of water therethrough should water flow from the makeup line while aperture 106 within base 104 is closed. A connecting pipe 107 extends downwardly from base 104 and circumscribes aperture 106. Connecting pipe 107 is joined with return line 7 (as shown in FIG. 7) to permit communication between float chamber 101 and the pool water. The portion of connecting pipe 107 adjacent base 104 is vertically oriented and vertically positioned to be approximately equivalent to the water level within the pool when the latter is filled or nearly filled. Thus, the water level within connecting pipe 107 will be representative of the water level within the pool when the pump within water control system 100 is not operating.

A float valve 108 is disposed within connecting pipe 107 and may be described as follows. A plate 110 is hingedly attached to the lower surface of base 104 by a hinge 111. A sealing member 112 is disposed upon the upper surface of plate 110. A float 113 is secured to plate 110. Float 113, being buoyant, will respond to the water level 114 within connecting pipe 107. As is well known to those skilled in the art, as water level 114 rises, float 110 will rise and plate 110 will pivot about hinge 111 until sealing member 112 contacts aperture 106 and seals the latter. Similarly, aperture 106 will be open whenever water level 114 no longer maintains plate 110 essentially adjacent the bottom surface of base 104.

From the above description, it will become apparent that although valve 9 (shown in FIG. 7) is open to permit water to flow through makeup line 8, no water will flow into connecting pipe 107 and thence into the pool if the pool is already filled. Instead, any water flowing through makeup line 8 will flow adjacent base 104 and through screen 105. Should the pool become overfilled and cause the water level within connecting pipe 107 to attempt to rise above base 104, a first flow restriction will be encountered by sealing member 112 engaging aperture 106. If that seal is faulty, the water may flow within the boundary defined by base 104, cover 103 and screen 105. From there, the water would flow out through screen 105 as air gap 102 would inhibit the water from flowing into makeup line 108. Thereby, there is no possibility of contamination of the fresh water supply within makeup line 8.

Figure 8:
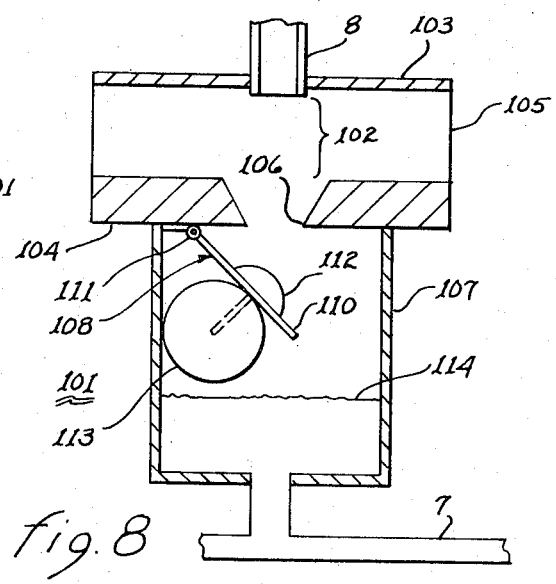
FIG. 8 is a cross-sectional view of apparatus for inhibiting reverse flow of water into a water makeup line.
Figure 9:
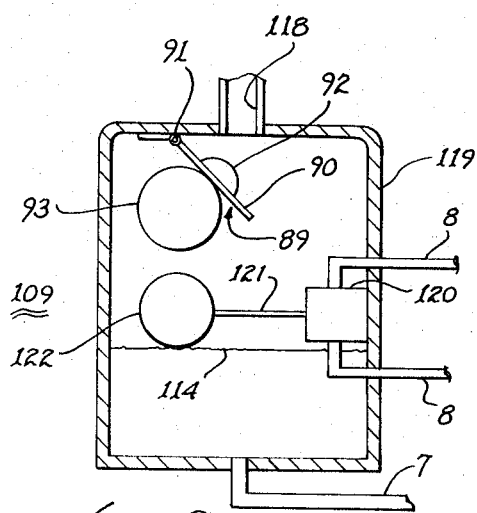
FIG. 9 is a cross-sectional view of a water level control apparatus locatable at a remote location.

The apparatus shown in FIG. 9, which apparatus may be substituted for valve 9, level control circuit 10, sensing tube 11 and conductors 12 (see FIG. 1) to provide a mechanical remotely located valve unit 109 to regulate the flow of fill water to pools. A chamber 119, vertically oriented to provide an indication of the water level within the pool, is connected to the return line 7 (see FIGS. 1 and 7). The top of the chamber 119 includes an aperture 118, which aperture prevents a pressure increase or decrease within chamber 119 as the water level 114 varies. A float valve system, similar to that described with respect to FIG. 8, regulates the opening of aperture 118 in response to the water level within the chamber. That is, as water level 114 rises, float 93 will rise, causing plate 90 to pivot about hinge 91 until sealing member 92 seals aperture 118. The float valve mechanism associated with aperture 118 prevents a flow of water from chamber 119 during a high water level condition. Thus, the apparatus shown in FIG. 9 may be located at any convenient location without danger of damage to the surroundings from a water overflow condition.

A valve 120 is disposed within chamber 119 to regulate the flow of water to the pool through pipe 8 (see FIGS. 1 and 7). A float 122, responsive to a water level 94, is attached to arm 121 extending from the operative mechanisms within valve 120. The vertical position of float 122 is translated through arm 121 to open or close valve 120.

Figure 10:
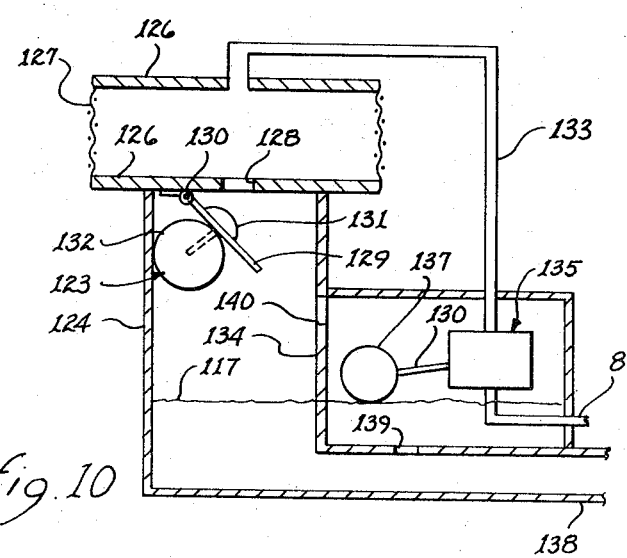
FIG. 10 is a cross-sectional view of a remote water level control apparatus including means for preventing reverse flow within the water makeup line.

The apparatus shown in FIG. 10, which apparatus combines the operative features of the apparatus shown in FIGS. 8 and 9. Housing 124 is in communication with the water in the pool through connecting pipe 138 and return line 7 (see FIG. 7). Housing 124 is vertically oriented so that water level 117 within the housing reflects the water level within the pool.

An apertured compartment 134 is disposed in proximity to the lower part of housing 124. Aperture 139 disposed at the bottom of compartment 134 and aperture 140 disposed at the top of the compartment permit the water level 117 within the compartment to fluctuate in accordance with the varying water level of the pool. Compartment 134 encloses a float operated valve 135, which valve includes an arm 136 and a float 137. Makeup line 8 is connected to the input of float valve 135 and water pipe 133 is connected to the output of the float valve. The fluctuating water level 117 acting upon the float valve 135 opens or closes the valve dependant upon whether the water level is low or high, respectively.

The makeup water flowing through pipe 133 is conveyed into housing 124 through a vertical air gap. The air gap is formed by a cover 126 encircling the extremity of pipe 133, an apertured base 126 disposed beneath the cover and a screen 127 circumscribing the cover and base. Aperture 128 disposed within base 126 is approximately vertically aligned with the extremity of pipe 133. A float valve 123, including a plate 129 pivotable about hinge 130, a sealing member 131 and a float 132, regulates the upward flow of water through aperture 128 in response to the water level 117 within housing 124. When the water level 117 is low, aperture 128 will be open and any makeup water flowing through pipe 133 will flow through aperture 128 and into housing 124. The makeup water introduced within housing 124 will flow through pipe 128, return line 7 and into the pool. If water level 117 is high, float 132 will be raised until sealing member 131 contacts aperture 128 and seals the aperture. Should any makeup water flow through pipe 133, it will run off through screen 127 and not be introduced to the pool. The air gap, represented by the vertical distance between cover 125 and base 126, prevents any of the water within housing 124 from flowing upwardly and into water pipe 133. Thus, the apparatus in FIG. 10 inhibits any of the pool water from being mixed with the fresh water supply within makeup line 8.

The above described modes of operation for the apparatus shown in FIGS. 8, 9 and 10 pertain primarily to the condition when the pumps within water control system 100 (see FIG. 7) are not operating and there is no pressure within return line 7. When the water control sytem 100 is recirculating and filtering the water within the pool, the pressure within return line 7 will be increased. In the apparatus shown in FIG. 8, the pressure within return line 7 will force the water level 114 within connecting pipe 107 to rise until the float valve 108 seals aperture 106 to prevent loss of water therethrough. Sealed aperture 106 also prevents any further introduction of makeup water into connecting pipe 107 through makeup line 8. Similarly, the pressure within return line 7 will force the water level 114 within the apparatus shown in FIG. 9 to rise, closing valve 120 and preventing further water flow through pipe 116. The rising water level will cause float valve 89 to seal aperture 118 to prevent loss of water from chamber 119. In the apparatus shown in FIG. 10, water level 117 will rise as a result of the pressure within return line 7 and close valve 135, preventing further flow of water to pipe 133. The rising water level 117 will also cause float valve 123 to seal aperture 128 and prevent loss of pool water therethrough.

Figure 11:
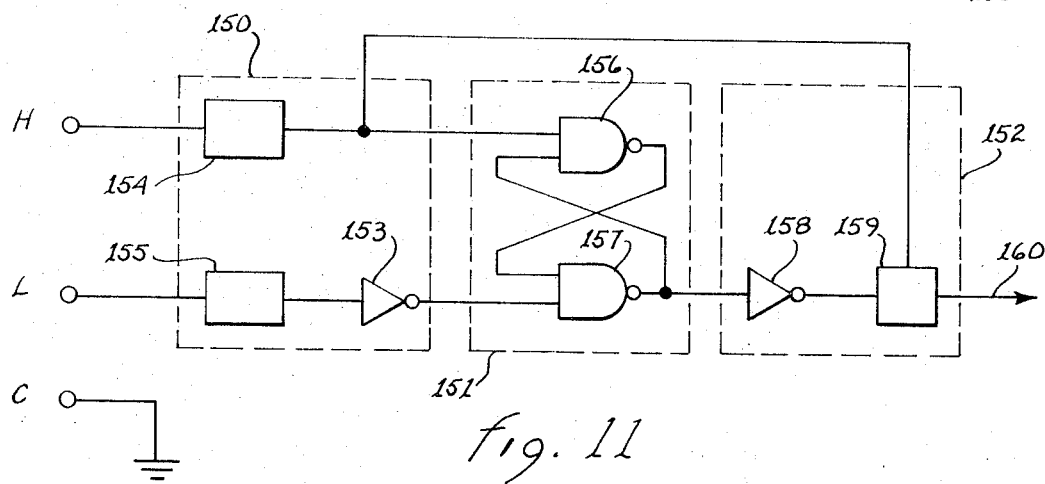
FIG. 11 is a block diagram of an electrical circuit useable with the present invention.

FIG. 11 illustrates a simplified block diagram of a modification of the circuit shown in FIG. 3. Three water level sensing probes, representing a common probe (C), a low water level probe (L) and a high water level probe (H), may be disposed within the water level sensing tube 11. The circuit shown in FIG. 11 eliminates the need for an overflow probe to sense an overflow condition and may be described as follows.

The circuit can be segregated into three primary stages wherein each stage performs a discrete signal processing function. The first stage 150 is a signal processor for converting the signals generated by probes L and H to signals having predetermined polarity and amplitude. The second stage 151 is a latch for obtaining a signal of a specified polarity and amplitude in response to the signals generated by probes L and H. The third stage 152 is a control signal processor for generating a control signal 160 to operate the previously described electromechanical devices.

Stage 150 may include a first driver 154 to act upon the signal generated by probe H and a second driver 155 to act upon the signal generated by probe L. A first output from driver 154 is conveyed to control circuit 159 within stage 152. A second output from driver 154 is conveyed to NAND gate 156 within stage 151. The output signal from second driver 155 is inverted by inverter 153 and conveyed to NAND gate 157 within stage 151. The combination of NAND gates 156 and 157 produce an output signal having a polarity dependent upon the signal generated by probes L and H. The output of stage 151 is acted upon by buffer 158 within stage 152 to render the output signal compatible with control circuit 159. In the event stage 151 fails to provide an input to control circuit 159, the first output from driver 154 to the control circuit prevents operation of electrically activated valve 9 (see FIG. 1). Thus, the circuit shown in FIG. 11, when substituted for the circuit shown in FIGS. 3, 5 and 6, permits the deletion of overflow probe 20 in the level sensing chamber 11. The output of control circuit 159 is a control signal 160 which controls the operation of the previously described electrically actuated valve.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. In a system for automatically maintaining the water level in a swimming pool having a suction line, a pump and a return line, and including a makeup water line connecting the return line to a source of makeup water under pressure, a normally closed, electrically actuated valve disposed in said makeup water line, a level sensing chamber positioned with respect to the swimming pool such that a normal range of pool water level falls intermediate the ends thereof, said sensing chamber having a fluid sealed lower end, an upper end thereof having a vent aperture for communicating with the atmosphere, means for placing the interior of said sensing chamber in direct liquid communication with said return line, a plurality of vertically separated level sensing probes extending into the interior of said sensing chamber, said plurality of level sensing probes including at least a lowermost common probe, a low water level probe positioned above said common probe, and a high water level probe positioned above said low water level probe, control means connected to said plurality of probes and to said valve for sensing a first condition in which no conductive path exists between said common probe and said low water level probe and responding to said first condition by energizing said electrically actuated valve to initiate the introduction of makeup water in the pool, said control means further sensing a second condition in which a conductive path exists between said common probe and said high water level probe and responding to said second condition by de-energizing said electrically actuated valve to terminate the introduction of makeup water into the pool, the improvement comprising in combination:

a. means for directing the flow of makeup water from the end of said makeup water line in a downward vertical direction;

b. an apertured base being vertically downwardly displaced from the end of said makeup line and having an aperture in general vertical alignment with the end of said makeup line for channelling the makeup water flowing from said makeup line through said apertured base;

c. a connecting pipe disposed intermediate said apertured base and said return line for conveying the makeup water to the return line; and d. a float valve disposed within said connecting pipe and responsive to the water level therein for sealing said aperture when the water level within said connecting pipe nears said aperture; whereby, said float valve in combination with the air gap intermediate said apertured base and the end of the makeup line impedes the flow of water from said pool through said return line and said connecting pipe into said makeup water line.

2. The combination as set forth in claim 1 wherein said control means comprises:

a. a first stage for processing the signals generated by each said probe;

b. a second stage for generating a signal representative of the output of all of said probes; and c. a third stage for establishing a control signal in response to the signals generated by all of said probes.

* * * * *